(12) United States Patent
Auer

(10) Patent No.: US 8,550,544 B2
(45) Date of Patent: Oct. 8, 2013

(54) VEHICLE BODY

(75) Inventor: Thomas Auer, Haar (DE)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 140 days.

(21) Appl. No.: 13/147,259

(22) PCT Filed: Feb. 2, 2010

(86) PCT No.: PCT/EP2010/051257
§ 371 (c)(1),
(2), (4) Date: Aug. 26, 2011

(87) PCT Pub. No.: WO2010/086458
PCT Pub. Date: Aug. 5, 2010

(65) Prior Publication Data
US 2011/0298243 A1      Dec. 8, 2011

(30) Foreign Application Priority Data

Feb. 2, 2009  (DE) .......................... 10 2009 007 122

(51) Int. Cl.
*B62D 25/00*        (2006.01)
(52) U.S. Cl.
USPC .............................. 296/191; 29/897.2; 296/30
(58) Field of Classification Search
USPC ......... 296/193.07, 191, 193.05, 181.1, 181.2, 296/204; 29/897.2
See application file for complete search history.

(56) References Cited

U.S. PATENT DOCUMENTS

| | | | |
|---|---|---|---|
| 2,115,903 A | 3/1935 | Breer et al. | |
| 2,254,458 A * | 9/1941 | Swallow | 296/191 |
| 2,723,154 A * | 11/1955 | Barenyi | 296/191 |
| 2,973,220 A * | 2/1961 | White | 296/181.2 |
| 3,331,627 A * | 7/1967 | Schroder et al. | 296/181.2 |
| 3,934,668 A * | 1/1976 | Gerin | 180/21 |
| 5,020,846 A | 6/1991 | Bonnett | |
| 5,688,021 A * | 11/1997 | Tomforde et al. | 296/203.01 |
| 5,733,631 A * | 3/1998 | Kelman | 428/172 |
| 5,806,620 A * | 9/1998 | DeRees et al. | 180/69.21 |
| 5,934,745 A * | 8/1999 | Moore et al. | 296/193.04 |
| 6,286,896 B1 * | 9/2001 | Eipper et al. | 296/187.03 |
| 6,749,254 B1 * | 6/2004 | Kleven et al. | 296/191 |
| 6,863,339 B2 * | 3/2005 | Bohm et al. | 296/191 |
| 7,044,535 B2 * | 5/2006 | Durand | 296/203.01 |

(Continued)

FOREIGN PATENT DOCUMENTS

| | | |
|---|---|---|
| DE | 1275372 | 8/1968 |
| DE | 3635317 | 4/1988 |
| DE | 10032556 | 1/2002 |
| DE | 10252475 | 5/2004 |

*Primary Examiner* — Glenn Dayoan
*Assistant Examiner* — Pinel Romain
(74) *Attorney, Agent, or Firm* — Bachman & LaPointe, P.C.

(57) ABSTRACT

A vehicle body (1) comprising an inner shell (3), an outer shell (2), a floor plate and a chassis, wherein the inner shell (3), the outer shell (2) and the floor plate are indirectly or directly interconnected and form a passenger compartment, the rigidity, especially the torsional rigidity and/or the flexural rigidity, of the vehicle body (1) is to be ensured without additional components or process steps. Furthermore, the vehicle body (1) is to be inexpensive to manufacture. The foregoing is achieved by the fact that at least one interior component (4, 5) is connected to the inner shell (3) and/or the supporting structure (9) in such a manner that it contributes to the rigidity, especially the torsional rigidity and/or the flexural rigidity, of the vehicle body (1).

17 Claims, 3 Drawing Sheets

(56) References Cited

U.S. PATENT DOCUMENTS

| | | | |
|---|---|---|---|
| 7,059,665 B2* | 6/2006 | Murai et al. | 296/181.2 |
| 7,152,896 B2* | 12/2006 | Roeth et al. | 296/30 |
| 7,287,797 B1* | 10/2007 | Belloso | 296/35.1 |
| 8,342,598 B2* | 1/2013 | Stanton | 296/191 |
| 2001/0028179 A1* | 10/2001 | Takemoto et al. | 296/204 |
| 2004/0178661 A1* | 9/2004 | Filipczak et al. | 296/181.1 |
| 2005/0212326 A1* | 9/2005 | Marion | 296/187.03 |
| 2010/0090500 A1* | 4/2010 | Montineri et al. | 296/191 |
| 2010/0101876 A1* | 4/2010 | Misencik | 180/65.21 |
| 2012/0126580 A1* | 5/2012 | Gandini | 296/193.07 |

* cited by examiner

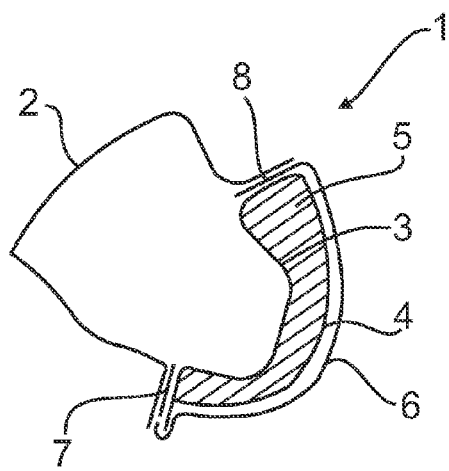
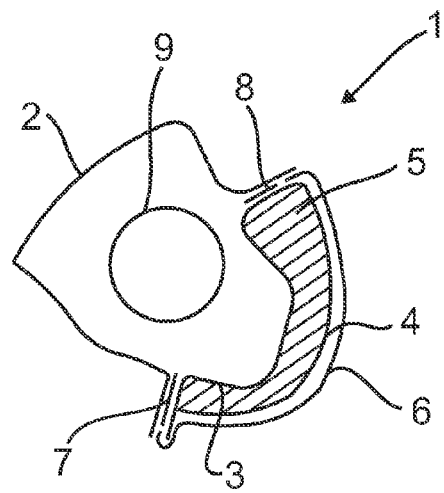
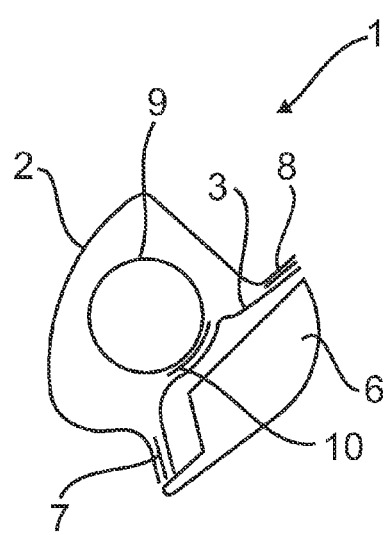
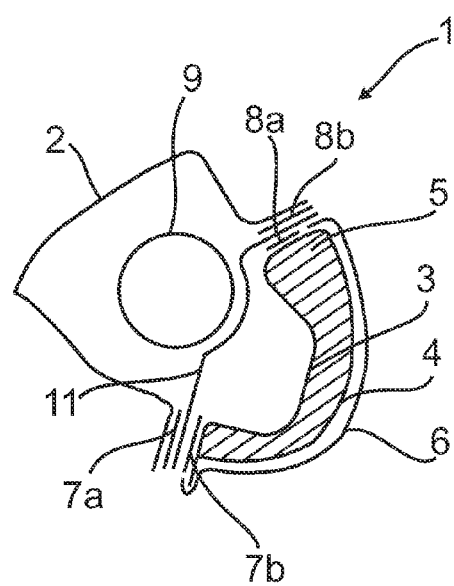

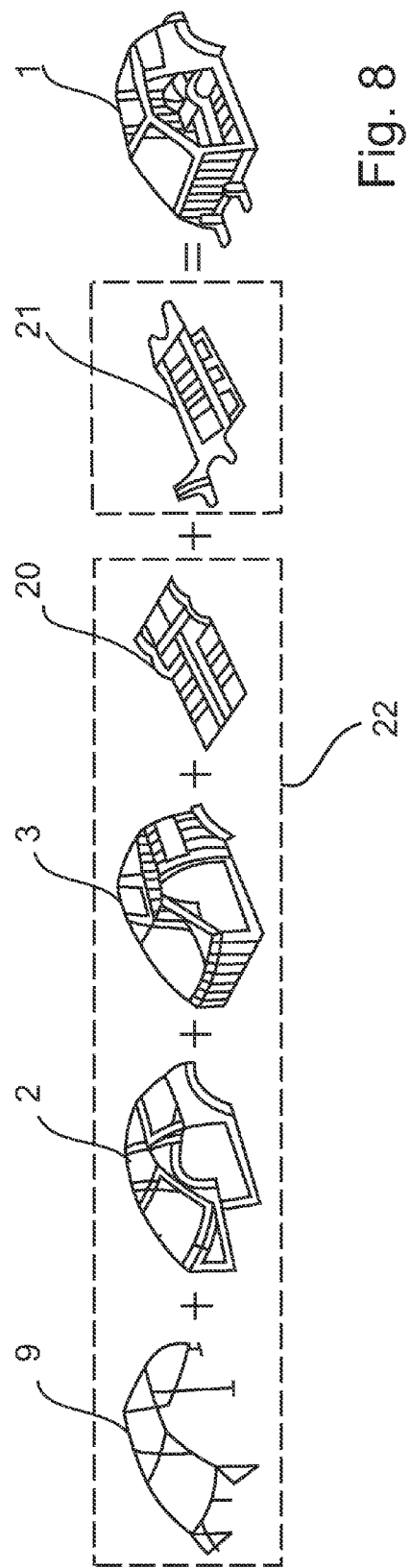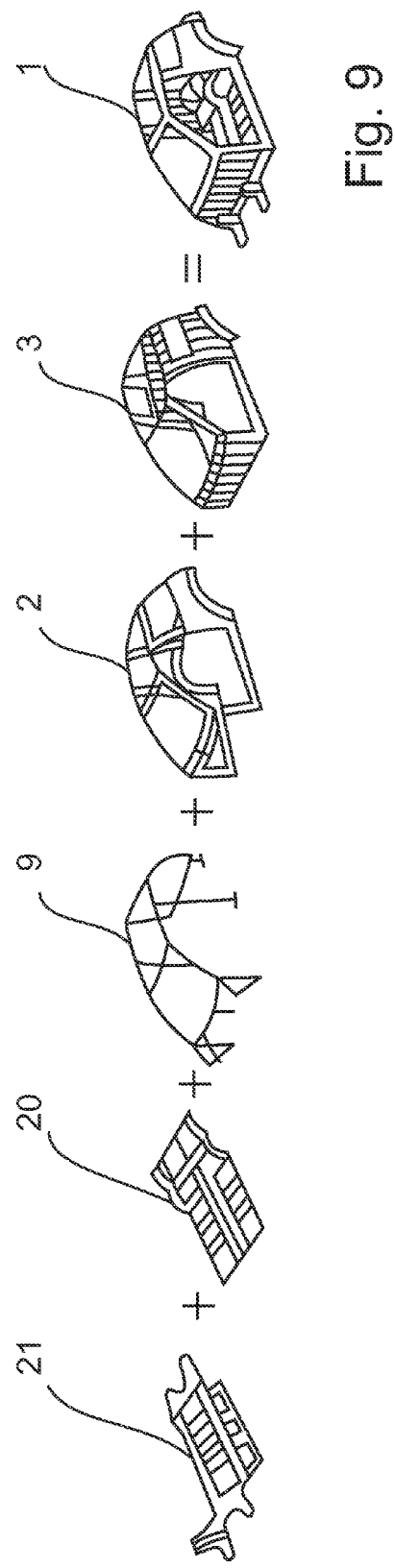

VEHICLE BODY

BACKGROUND OF THE INVENTION

The present invention relates to a vehicle body and to a motor vehicle and a method of manufacturing a vehicle body.

In motor vehicles, bodies made of steel or aluminum are used having a two-shell or a multi-shell structure, wherein one or several inner shells and one outer shell are both made of metal and have an approximately equal shape in order to be capable of being easily interconnected. Interior equipment is attached to the inner shell, wherein the interior equipment is normally snap-fitted onto the inner shell at selected positions, creating a more or less loose connection between the interior equipment and the inner shell. The outer shell and the inner shell as well as the interior equipment form a passenger compartment together with other components.

DE 102 52 475 A1 discloses a vehicle body having a two-part structure, wherein an inner shell and an outer shell are divided and made of plastic. The inner shell is attached to a basic frame made of metal, and the outer shell is subsequently placed at a distance above the inner shell such that a cavity is formed between the inner shell and the outer shell. In order to stiffen the vehicle body, either the cavity is foamed using plastic foam and/or metal foam, or body reinforcing elements are arranged in the cavity.

DE 1 275 372 B shows a motor vehicle having a vehicle body made of plastic material having a torsion-resistant floor assembly comprising longitudinal and cross frame beams made of metal and embraced by two plastic shells. The remaining assemblies of the vehicle body are built up on this torsion-resistant floor assembly using simple and large-area shell parts. Therein it is disadvantageous that the remaining assemblies are not torsion-resistant.

U.S. Pat. No. 7,287,797 B1 discloses a motor vehicle having a modular structure arranged on a metal chassis. The structure comprises three prefabricated parts which are manufactured in a plastic injection molding process using a stable plastic material, which is stabilized by means of rigid foam. Disadvantageously, an additional process step is required due to the plurality of parts used, in order to improve the rigidity of the modular structure.

It is therefore an object of the present invention to provide a vehicle body, a motor vehicle and a method of manufacturing the vehicle body, wherein the rigidity, especially the torsional rigidity and/or the flexural rigidity, of the vehicle body is ensured without additional components or process steps. Furthermore, the vehicle body and the vehicle are to be inexpensive to manufacture.

SUMMARY OF THE INVENTION

This object is achieved by the vehicle body according to the invention comprising an inner shell, an outer shell, a floor plate and a chassis, wherein the inner shell, the outer shell and the floor plate are indirectly or directly interconnected and form a passenger compartment, and wherein at least one interior component is connected to the inner shell in such a manner that it contributes to the rigidity, especially the torsional rigidity and/or the flexural rigidity, of the vehicle body. The at least one interior component contributes to the rigidity of the vehicle body in such a manner that the at least one interior component is part of the vehicle body.

An interior component can, as a panel component of the vehicle body, be provided in a plurality of embodiments. For example, it may be embodied as a roof liner and/or a column panel engaging in the roof liner, as a glove compartment, as a panel or as a storage compartment in the vehicle door. Thus the interior equipment does not only act in its function as a panel of the passenger compartment of the vehicle body, but at the same time acts as a supporting component contributing to the rigidity of the vehicle body. Therefore additional components for stiffening the vehicle body are at least to some extent dispensed with, which contributes to a reduction of parts of the vehicle body. This part reduction is directly correlated to a weight reduction of the vehicle body. An additional supporting structure, to which the inner shell and the outer shell are attached, may be at least to some extent dispensed with.

In particular, the at least one interior component is connected to the inner shell and/or the supporting structure in such a manner that the contribution of the at least one interior component to the rigidity amounts to at least 5%, so that the interior component in combination increases the rigidity of the vehicle body.

In a further possible embodiment, the at least one interior component is connected to the inner shell such that a relative movement of less than 1 mm is possible between the interior component and the inner shell. Prevention of larger movements between the interior component and the inner shell enables the at least one interior component to contribute to the rigidity of the vehicle body.

In a supplementary embodiment, the interior component is attached to the inner shell partially integrally, in particular adhesively. An integral connection results in the fact that the interior component rests on the inner shell or the supporting structure, in particular over a large area, imparting high stability to the vehicle body, in particular with respect to torsional forces and/or flexural forces. Preferably, the area over which the at least one interior component rests on the inner shell amounts to at least 5% of the area of the inner shell on the inside, i.e. on the side of the inner shell facing away from the outer shell.

Alternatively, the at least one interior component is connected to the inner shell in a positive-locking and/or friction-locking manner, in particular by means of at least one bolt engaging in at least one bushing. Such a connection of the interior component to the inner shell is especially advantageous in cases where the interior component has a complex shape and/or has to carry additional elements, as it is necessary, for example, in the case of the lining of an instrument panel and/or a column.

In one variant, the at least one interior component comprises a stable cover formed on the side of the inner shell facing away from the outer shell, wherein an intermediate space between the inner shell and the stable cover is filled with an elastic, especially foam-like, mass. In addition to increasing the rigidity of the vehicle body, this embodiment at the same time improves the safety of the persons sitting in the vehicle, since the foam-like mass deforms in the event of an impact on the interior component and thus constitutes protection in the case of an accident.

Advantageously, the inner shell and/or the outer shell are, at least partially, made of a plastic material. A body made of plastic entails a weight reduction of the vehicle, which has an advantageous effect on the fuel consumption of the vehicle. Use is made, for example, of a plastic material produced in an injection molding process. In order to further improve the support function of the inner shell, according to a special embodiment use is made, at least to some extent, of a long fiber reinforced semifinished thermoplastic material, which is generally known as organo sheet. In cases where plastic material which has already been dyed is used for the inner shell and/or the outer shell, in particular for the outer shell, high costs for applying a topcoat can be saved.

Preferably, the inner shell and/or the outer shell are, at least partially, made of metal, for example steel or aluminum.

In a further embodiment the inner shell and/or the outer shell are interconnected in a friction-locking and/or positive-locking manner and/or integrally, in particular adhesively, and form a closed profile. The closed profile of the inner shell and the outer shell assists the support qualities of the inner and outer shell and increases the rigidity, especially the torsional rigidity of the vehicle body. Any substantial displacement of the inner shell with respect to the outer shell is reliably prevented by the connection techniques applied, thereby increasing the stability of the vehicle body.

In one variant, the inner shell and/or the outer shell are formed in several parts. This increases the variety of possible ways of joining together the inner shell and the outer shell during the manufacturing process and facilitates the manufacturing process itself. In this way, the individual parts of the inner shell can still be attached to the outer shell even after they have been mounted on a vehicle chassis.

In a supplementary embodiment, a supporting structure made of metal, in particular steel or aluminum is arranged between the inner shell and the outer shell. By using the supporting structure formed of metal, a very high degree of rigidity of the vehicle body is achieved, even if the supporting structure comprises of profiles and/or of pipes made of light metal, in particular as a frame.

A motor vehicle according to the invention comprises a vehicle body described in this patent application.

A method of manufacturing a vehicle body according to the invention comprises the steps: providing an inner shell, an outer shell, a floor plate and a chassis, subsequent indirect or direct connection of the inner shell, the outer shell and the floor plate such that a passenger compartment is formed, wherein at least one interior component is connected to the inner shell in such a manner that it contributes to the rigidity, especially the torsional rigidity and/or the flexural rigidity, of the vehicle body. By means of this simple joining and assembling process a composite-structure cell is created, wherein the interior equipment in addition to its function as a lining also acts as a supporting module. Due to the support function of the inner shell including the interior equipment, the supporting structure of the vehicle body is designed to have less weight, which optimizes the weight of the overall structure.

In a further embodiment, the interior component and/or the inner shell and/or the outer shell and/or the floor plate and/or a supporting structure are interconnected in a friction-locking and/or a positive-locking manner and/or integrally. Depending on the shape design and the structure of the individual elements, a connection method is chosen which to the highest possible extent meets the requirement of maximum rigidity of the vehicle body and which nevertheless can be realized in an inexpensive manner during manufacture. The connection is performed, for example, by means of adhesive bonding and/or screws and/or bolts and/or rivets.

In a supplementary variant, the inner shell is provided in several parts and the multi-part interior equipment is connected to at least one part of the inner shell, and subsequently the multi-part inner shell including the interior equipment is connected to the outer shell and/or the supporting structure and/or the floor plate. The inner shell supporting the interior equipment is provided as a prefabricated component and may be attached in this state at any time during the manufacturing process to the outer shell or the supporting structure. The multi-part design of the inner shell thus permits to insert the individual parts of the inner shell at different manufacturing stages of the vehicle body.

Preferably, at first the passenger compartment is formed from the outer shell, the inner shell, preferably the supporting structure, and the floor plate. Thereafter the passenger compartment is placed on the chassis or the floor plate is placed on the chassis, whereupon the supporting structure is applied onto the bottom plate. Subsequently, the outer shell is mounted on the supporting structure and finally the multi-part inner shell is attached to the outer shell and, preferably the supporting structure. The fact that the passenger compartment is prefabricated and that the passenger compartment is subsequently placed on the chassis has the advantage that different passenger compartments can be prefabricated, all of which can be placed on the same chassis, thereby allowing manufacturing of different types of vehicles.

BRIEF DESCRIPTION OF THE DRAWINGS

Hereinafter exemplary embodiments of the invention will be explained in more detail with reference to the accompanying drawings, wherein FIG. 1 is a cross-sectional view of a first exemplary embodiment of an A-column of a vehicle body;

FIG. 2 is a cross-sectional view of a second exemplary embodiment of an A-column of a vehicle body;

FIG. 3 is a cross-sectional view of a third exemplary embodiment of an A-column of a vehicle body;

FIG. 4 is a cross-sectional view of a fourth exemplary embodiment of an A-column of a vehicle body;

FIG. 8 shows a first exemplary embodiment of a method of assembling the vehicle body; and FIG. 9 shows a second exemplary embodiment of a method of assembling the vehicle body.

DETAILED DESCRIPTION

Figure 5:
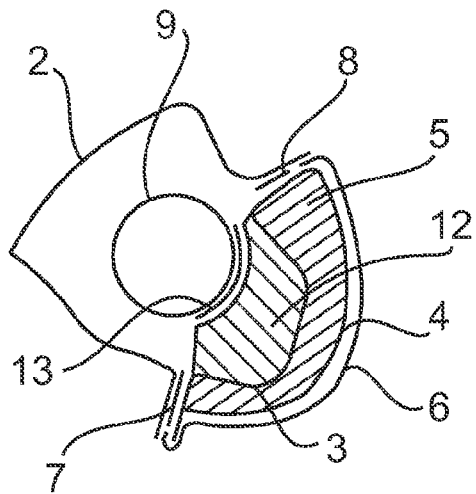
FIG. 5 is a cross-sectional view of a fifth exemplary embodiment of an A-column of a vehicle body.

FIGS. 1 to 7 each show a cross section of an A-column of a vehicle body 1 of a motor vehicle. In each of FIGS. 1 to 7, the A-column is formed of an outer shell 2 and an inner shell 3, which are each interconnected at their marginal areas by means of adhesive connections 7, 8. Thus the outer shell 2 and the inner shell 3 form a supporting closed profile. The inner shell 3 is made of a long fiber reinforced semifinished thermoplastic material (organo sheet). The outer shell 2 can also be made of a long fiber reinforced semifinished thermoplastic material or of metal, especially light metal, such as aluminum or steel, or of a plastic material.

As shown in FIG. 1, an interior component 4, 5 is attached to the inner shell 3, which interior component 4, 5 comprises a safety element 4 in the form of a stable cover made of metal or a plastic material and covering the inner shell 3 at its side facing away from the outer shell 2, wherein foam 5 is formed between the inner shell 3 and the safety element 4, which foam 5 serves to attach (adhesively bond) the safety element 4 to the inner shell 3 as well as to protect a passenger of the vehicle in the case of an accident due to the elastic and/or plastic properties of the foam 5. A coating 6 embracing the inner shell 3 in the vicinity of the two adhesive connections 7, 8 serves as a panel of the passenger compartment of the vehicle body 1. The vehicle body 1 with the structure as shown in FIG. 1 has increased rigidity, in particular with respect to torsional forces and/or flexural forces. It is also possible to provide embodiments without the safety element 4.

In FIG. 2, the outer shell 2 and the inner shell 3 supporting the interior component 4, 5—the outer shell 2 and the inner shell 3 being arched oppositely to one another—enclose a supporting structure 9 comprising a metal profile or formed pipes made of metal, in particular aluminum and/or steel. The outer shell 2 and the inner shell 3 may be attached to the supporting structure 9 in the most varied ways.

According to FIG. 3, the inner shell 3 is formed such that it abuts on and partially encloses the supporting structure 9. An adhesive connection 10 between the supporting structure 9 and the inner shell 3 reliably connects both parts, wherein the connection between the outer shell 2 and the inner shell 3 at their marginal areas by the adhesive connection 7, 8 is maintained.

As shown in FIG. 4, a strut member 11 in the form of a metal strip or a plastic strip is inserted between the inner shell 3 and outer shell 2 in order to reinforce the vehicle body, wherein the end portions of the strut member 11 are adhesively bonded to the marginal areas of the inner shell 3 as well as to the marginal areas of the outer shell 2 via respective adhesive connections 7a, 7b, 8a, 8b. The strut member 11 partially embraces the supporting structure 9, resulting in a stabilization of the assembly.

In another embodiment shown in FIG. 5, a dome 12 is formed at the inner shell 3 facing the supporting structure 9 and partially abutting in a positive-locking manner on the supporting structure 9. In this abutting area the dome 12 of the inner shell 3 is connected to the supporting structure 9 via a further adhesive connection 13.

Figure 6:
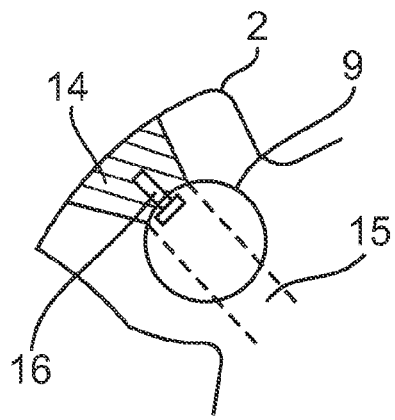
FIG. 6 is a cross-sectional view of a sixth exemplary embodiment of an A-column of a vehicle body.
Figure 7:
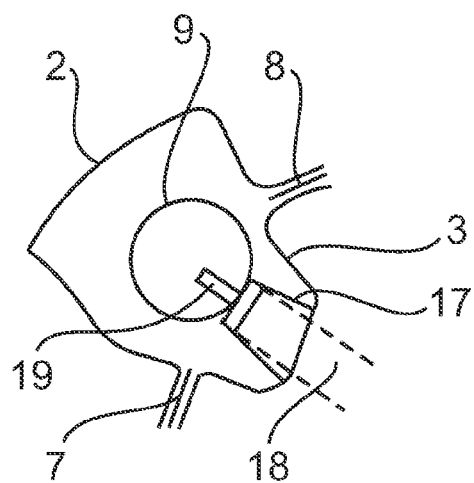
FIG. 7 is a cross-sectional view of a seventh exemplary embodiment of an A-column of a vehicle body.

As shown in FIGS. 6 and 7, the inner shell 3 and the outer shell 2 can be fixed to the supporting structure 9 also by means of connecting elements. According to FIG. 6, a dome 14 is formed or a mount is attached at the inside of the outer shell 2. The dome 14 abuts on the supporting structure 9, which has a through-hole 15 extending transversely to the longitudinal extension of the supporting structure 9. A screw 16 is led through this through-hole 15 and anchored in the dome 14 of the outer shell 2. The screw 16 can also be embodied as a rivet nut or the like.

As can be seen from FIG. 7, there is provided a mount 17 at the inside of the inner shell 3, wherein the mount 17 has a through-hole 18 in which a screw 19 is inserted. The screw 19 is screwed onto the hollow supporting structure 9.

The different connection techniques described in connection with FIGS. 1 to 7 offer various possible ways of manufacturing a vehicle body 1. The inner shell 3 is made up of several parts, and in a first step the various parts of the inner shell 3 are connected to the corresponding interior components 4, 5. According to a possible embodiment, the outer shell 2 is subsequently screwed and/or glued to the supporting structure 9. Thereafter the multi-part inner shell 3 is connected to the outer shell 2 by means of adhesive bonding and to the supporting structure 9 by means of screws and/or by adhesive bonding. Then an interior floor plate 20 is attached to this assembly of inner shell 3, outer shell 2 and supporting structure 9. According to an especially preferred embodiment according to FIG. 8, the multi-part inner shell 3 is screwed and/or glued to the supporting structure 9. This assembly is then screwed and/or glued to the interior floor plate. Further the assembly formed in this way is screwed and/or glued to the outer shell 2, wherein a passenger compartment 22 is created as a separate assembly group. This passenger compartment 22 is screwed and glued to a chassis 21. The chassis 21 made of metal constitutes a (vehicle body) frame determining in particular the wheel distances of a vehicle. Passenger compartments 22 of different design can be mounted on such a chassis.

Another method of manufacturing the vehicle body is shown in FIG. 9. In the case of this method, too, the inner shell 3 is formed in several parts, wherein the various parts of the inner shell 3 are at first connected to the corresponding interior components 4, 5. Thereafter the interior floor plate 20 is mounted on the chassis 21. Subsequently, the supporting structure 9 is attached to the interior floor plate 20. According to a first embodiment, the next step comprises placing the outer shell 2 onto the supporting structure 9 and screwing and/or gluing it thereto. Therein the outer shell 2 is made of a dyed plastic material, so that applying a topcoat to the vehicle body 1 can be dispensed with. Finally, the multi-part inner shell 3 is glued to the outer shell 2 and connected to the supporting structure 9 by means of screws and/or adhesive bonding, thereby completing the vehicle body 1.

According to another especially preferred alternative embodiment, the multi-part inner shell 3 is screwed and/or glued to the supporting structure 9 and the assembly comprising the interior equipment 4, 5, the interior floor plate 20 and the chassis 21. The outer shell 2 is attached to the assembly comprising the supporting structure 9 as well as the inner shell 3, thereby completing the vehicle body 1.

In summary, the vehicle body 1 according to the invention and the motor vehicle according to the invention entail considerable advantages. In the case of the structure as described herein, the interior equipment 4, 5 is embodied as a supporting part, thereby acting also as a supporting module in addition to its function as a lining. In spite of the fact that there are no additional parts for increasing rigidity, resulting in a weight reduction of the vehicle, the rigidity, especially the torsional rigidity and/or the flexural rigidity, of the vehicle is considerably improved. The joining and assembling process of the vehicle body 1 is essentially simplified.

The invention claimed is:

1. A vehicle body, comprising an inner shell, an outer shell, a floor plate and a chassis, wherein the inner shell, the outer shell and the floor plate are connected and together form an entire passenger compartment; and at least one interior non-passenger compartment forming component is connected to the inner shell in such a manner that, at least one interior component is attached to the inner shell at least partially adhesively it contributes to the torsional rigidity and the flexural rigidity of the vehicle body.

2. The vehicle body according to claim 1, wherein the at least one interior component is connected to the inner shell in such a manner that the contribution of the at least one interior component to the rigidity is at least 5%.

3. The vehicle body according to claim 1, wherein the at least one interior component is connected to the inner shell in such a manner that a relative movement of less than 1 mm is possible between the interior component and the inner shell.

4. The vehicle body according to claim 1, wherein the at least one interior component is connected to the inner shell in a positive-locking manner by at least one bolt engaging in at least one bushing.

5. The vehicle body according to claim 1, wherein the at least one interior component comprises a stable cover formed on a side of the inner shell facing away from the outer shell, wherein an intermediate space between the inner shell and the stable cover is filled with a deformable foam mass.

6. The vehicle body according to claim 1, wherein at least one of the inner shell and the outer shell are, at least partially, made of a plastic material.

7. The vehicle body according to claim 1, wherein the inner shell and the outer shell are interconnected adhesively and form a closed profile.

8. The vehicle body according to claim 1, wherein at least one of the inner shell and the outer shell are formed in several parts.

9. The vehicle body according to claim 1, wherein a supporting structure made of metal is arranged between the inner shell and the outer shell.

10. A motor vehicle comprises a vehicle body comprising an inner shell, an outer shell, a floor plate and a chassis, wherein the inner shell, the outer shell and the floor plate are connected and together form an entire passenger compartment; and
at least one interior non-passenger compartment forming component is connected to the inner shell in such a manner that it contributes to the torsional rigidity and the flexural rigidity of the vehicle body.

11. A method of manufacturing a vehicle body, wherein an inner shell, an outer shell, a floor plate and a chassis are provided and subsequently the inner shell, the outer shell and the floor plate are directly interconnected such that an entire passenger compartment is formed, the method comprises connecting at least one interior non-passenger compartment forming component to the inner shell in such a manner that the at least one interior component contributes to the rigidity of the vehicle body.

12. The method according to claim 11, including interconnecting the interior component, the inner shell, the outer shell, the floor plate, and a supporting structure in one of a friction-locking, positive locking, and integrally manner.

13. The method according to claim 11, including providing the inner shell in several parts and the multi-part interior equipment is connected to at least one part of the inner shell, and subsequently the multi-part inner shell including the interior equipment is connected to the outer shell and the supporting structure and the floor plate.

14. The method according to claim 11, including forming at first the passenger compartment from the outer shell, the inner shell, the supporting structure, and the floor plate, whereafter the passenger compartment is placed on the chassis whereupon the supporting structure is applied onto a bottom plate, wherein subsequently the outer shell is mounted on the supporting structure and finally the inner shell is attached to the outer shell and the supporting structure.

15. The vehicle body according to claim 1, wherein the at least one interior component comprises a stable cover formed on a side of the inner shell facing away from the outer shell.

16. The motor vehicle according to claim 10, wherein the at least one interior component comprises a stable cover formed on a side of the inner shell facing away from the outer shell.

17. The method according to claim 11, including forming the at least one interior component comprising a stable cover a side of the inner shell facing away from the outer shell.

* * * * *